Oct. 30, 1945.  A. H. BENNETT  2,388,032
OPTICAL SYSTEM
Filed Oct. 28, 1943
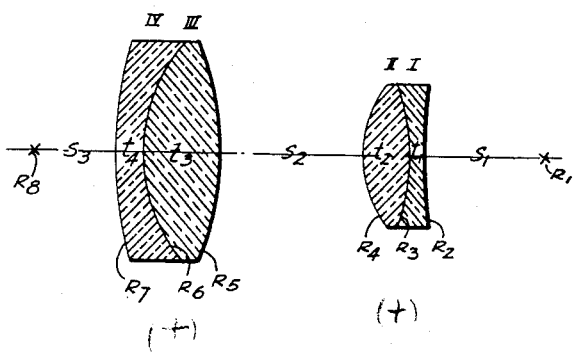
INVENTOR.
ALVA H. BENNETT.
BY Raymond A. Paquin
ATTORNEY Patented Oct. 30, 1945

2,388,032

UNITED STATES PATENT OFFICE 2,388,032

OPTICAL SYSTEM

Alva H. Bennett, Kenmore, N. Y., assignor, by mesne assignments, to American Optical Company, Southbridge, Mass., a voluntary association Application October 28, 1943, Serial No. 508,026

4 Claims. (Cl. 88—57)

This invention relates to optical systems and more particularly to a new and improved optical system for use in an ocular for a visual optical measuring instrument.

An object of the invention is to provide a new and improved optical system of the type set forth which has a high eye point and which is corrected for lateral color and distortion and which has a flat field and which is corrected for a flat focal plane to provide an excellent image of a reticule consisting of radial and tangential line elements.

Other objects will be apparent from the following description taken in connection with the accompanying drawing. Many changes may be made in the details of construction and arrangement of parts without departing from the spirit of the invention as expressed in the accompanying claims. I, therefore, do not wish to be limited to the exact details of construction and arrangement of parts shown and described as preferred form has been given by way of illustration only.

Referring to the drawing:

The single figure is a sectional view of an optical system embodying the invention.

In the construction of an optical system for use as an ocular of a visual optical measuring instrument it is desirable that such system be corrected for lateral color and also that such system have a high eye point and flat field and be well corrected for distortion as well as corrected for a flat focal plane which will provide an excellent image of a reticule consisting of radial and tangential line elements for measurement purposes.

It is, therefore, the object of the present application to provide an optical system for the purpose set forth and which optical system provides all of these desirable features.

Referring more particularly to the drawing, the optical system comprises two cemented doublets. The front doublet consists of the element I and II and the rear doublet consists of the elements III and IV.

The axial separation $S_2$ between the two doublets is approximately 13.62 mm.

$R_1$ indicates the eye point and the distance $S_1$ of said eye point is approximately 12.08 mm. and the distance $S_3$ of the focal plane from the rear surface of the element IV is approximately 8.85 mm.

The radius of the front surface $R_2$ of the element I which is the surface nearest the observer is approximately +68.19 mm., the radius $R_3$ is approximately −24.90 mm. and the thickness $t_1$ approximately 1.8 mm.

The radius of the surface $R_4$ is approximately +11.49 mm. and the thickness $t_2$ of the element II is approximately 4.5 mm.

The radius $R_5$ of the front surface of the element III is approximately −25.32 mm., the radius of the surface $R_6$ is approximately +16.31 mm. and the thickness $t_3$ of the element III is approximately 7.65 mm.

The radius of the rear surface $R_7$ of the element IV is approximately +39.77 mm. and the thickness $t_4$ of said element is approximately 2.7 mm.

The above figures are given for a lens system having a magnification of 9X and, of course, if the same system is adapted for other magnifications then the above figures will be ratioed for the particular magnification to which the system is adapted.

In designating the sign of the radii in the above description the following conventional method has been followed.

A radius of curvature is considered positive if the direction from the vertex of the surface to the center of curvature is in the same direction as that of the transmission of light along the axis of the system. The radius of curvature is considered negative if the direction from the vertex of the surface to the center of curvature is in the opposite direction to that of the transmission of light along the axis of the system.

The elements I and IV are of an extra dense flint glass having a refractive index of approximately 1.72 and an Abbe number of approximately 29.3.

The elements II and III are of a spectacle crown glass having a refractive index of approximately 1.52 and an Abbe number of approximately 58.5.

The optical system described above has been found to meet all of the requirements specified above and to provide a satisfactory ocular for a visual measuring instrument.

It will therefore be seen that I have provided a simple, efficient and economical construction for obtaining all of the objects and advantages of the construction.

Having described my invention, I claim:

1. In an optical system of the type set forth, a pair of doublets, each of said doublets consisting of a divergent element of extra dense flint glass having a refractive index of approximately 1.72 and an Abbe number of approximately 29.3 and a convergent element of spectacle crown glass having a refractive index of approximately 1.52 and an Abbe number of approximately 58.5, the radii of curvature of the surfaces of said elements being computed to provide an optical system of desired magnification and ratioed from the following radii computed for an optical system of 9X magnification having the radius of the front surface of the first element of approximately +68.19 mm., the radius of the rear surface of the first element and the first surface of the second element being approximately −24.90 mm., the radius of the rear surface of the second element being approximately +11.49 mm., the radius of the front surface of the third element being approximately −25.32 mm., the radius of the rear surface of said third element and the front surface of the said fourth element being approximately +16.31 mm. and the radius of the rear surface of the fourth element being approximately +39.77 mm., the axial thickness of said first element being approximately 1.8 mm., the axial thickness of said second element being approximately 4.5 mm., the axial thickness of the third element being approximately 7.65 mm. and the axial thickness of said fourth element approximately 2.7 mm. and the axial separation of said doublets being approximately 13.62 mm.

2. In an optical system of the type set forth, a pair of doublets, each of said doublets consisting of a divergent element of extra dense flint glass having a refractive index of approximately 1.72 and an Abbe number of approximately 29.3 and a convergent element of spectacle crown glass having a refractive index of approximately 1.52 and an Abbe number of approximately 58.5, the radii of curvature of the surfaces of said elements being computed to provide an optical system of desired magnification and ratioed from the following radii computed for an optical system of 9X magnification having the radius of the front surface of the first element of approximately +68.19 mm., the radius of the rear surface of the first element and the first surface of the second element being approximately −24.90 mm., the radius of the rear surface of the second element being approximately +11.49 mm., the radius of the front surface of the third element being approximately −25.32 mm., the radius of the rear surface of said third element and the front surface of the said fourth element being approximately +16.31 mm. and the radius of the rear surface of the fourth element being approximately +39.77 mm., the focal distance of said system being approximately 8.85 mm.

3. In an optical system of the type set forth, a pair of doublets, each of said doublets consisting of a divergent element of extra dense flint glass having a refractive index of approximately 1.72 and an Abbe number of approximately 29.3 and a convergent element of spectacle crown glass having a refractive index of approximately 1.52 and an Abbe number of approximately 58.5, the radii of curvature of the surfaces of said elements being computed to provide an optical system of desired magnification and ratioed from the following radii computed for an optical system of 9X magnification having the radius of the front surface of the first element of approximately +68.19 mm., the radius of the rear surface of the first element and the first surface of the second element being approximately −24.90 mm., the radius of the rear surface of the second element being approximately +11.49 mm., the radius of the front surface of the third element being approximately −25.32 mm., the radius of the rear surface of said third element and the front surface of the said fourth element being approximately +16.31 mm. and the radius of the rear surface of the fourth element being approximately +39.77 mm. and the eye point of said system being approximately 12.08 mm.

4. In an optical system of the type set forth, a pair of doublets, each of said doublets consisting of a divergent element of extra dense flint glass having a refractive index of approximately 1.72 and an Abbe number of approximately 29.3 and a convergent element of spectacle crown glass having a refractive index of approximately 1.52 and an Abbe number of approximately 58.5, the radii of curvature of the surfaces of said elements being computed to provide an optical system of desired magnification and ratioed from the following radii computed for an optical system of 9X magnification having the radius of the front surface of the first element of approximately +68.19 mm., the radius of the rear surface of the first element and the first surface of the second element being approximately −24.90 mm., the radius of the rear surface of the second element being approximately +11.49 mm., the radius of the front surface of the third element being approximately −25.32 mm., the radius of the rear surface of said third element and the front surface of the said fourth element being approximately +16.31 mm. and the radius of the rear surface of the fourth element being approximately +39.77 mm., the eye point of said system being approximately 12.08 mm. and the focal distance of said system being approximately 8.85 mm.

ALVA H. BENNETT.